(12) United States Patent
Cutu et al.

(10) Patent No.: US 10,481,740 B2
(45) Date of Patent: Nov. 19, 2019

(54) PROJECTING A STRUCTURED LIGHT PATTERN ONTO A SURFACE AND DETECTING AND RESPONDING TO INTERACTIONS WITH THE SAME

(71) Applicant: ams Sensors Singapore Pte. Ltd., Singapore (SG)

(72) Inventors: Florin Cutu, San Jose, CA (US); Chi Zhang, Fremont, CA (US)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 37 days.

(21) Appl. No.: 15/661,193

(22) Filed: Jul. 27, 2017

(65) Prior Publication Data

US 2018/0032210 A1 Feb. 1, 2018

Related U.S. Application Data

(60) Provisional application No. 62/369,255, filed on Aug. 1, 2016.

(51) Int. Cl.

| | |
|---|---|
| *G06F 3/048* | (2013.01) |
| *G06F 3/042* | (2006.01) |
| *G06T 7/521* | (2017.01) |
| *G06T 7/246* | (2017.01) |
| *G06T 7/11* | (2017.01) |
| *G06T 7/155* | (2017.01) |
| *G06F 3/01* | (2006.01) |

(Continued)

(52) U.S. Cl.
CPC ............ *G06F 3/0425* (2013.01); *G06F 3/017* (2013.01); *G06K 9/00335* (2013.01); *G06T 7/11* (2017.01); *G06T 7/136* (2017.01); *G06T 7/155* (2017.01); *G06T 7/246* (2017.01); *G06T 7/248* (2017.01); *G06T 7/521* (2017.01); *G06T 2207/10048* (2013.01); *G06T 2207/20036* (2013.01); *G06T 2207/20092* (2013.01); *G06T 2207/30241* (2013.01)

(58) Field of Classification Search
CPC .... G06F 3/0426; G06F 3/017; G06F 3/04886; G06K 9/00335

See application file for complete search history.

(56) References Cited

U.S. PATENT DOCUMENTS

| | | | |
|---|---|---|---|
| 7,440,590 B1 * | 10/2008 | Hassebrook | G01B 11/2513 345/582 |
| 8,320,621 B2 | 11/2012 | McEldowney | |

(Continued)

FOREIGN PATENT DOCUMENTS

WO WO 2015/130226 9/2015

*Primary Examiner* — Thanh T Vu
(74) *Attorney, Agent, or Firm* — Michael Best & Friedrich LLP

(57) ABSTRACT

The present disclosure describes projecting a structured light pattern onto a surface and detecting and responding to interactions with the same. A method includes acquiring an image based on light reflected from a vicinity of the projection surface, and identifying regions of the acquired image that correspond to a feature that is within a specified distance of the projection surface by identifying regions of the acquired image for which intensity data differs relative to other regions of the acquired image and which fit a specified homographic relationship with respect to corresponding regions of a reference image.

17 Claims, 5 Drawing Sheets

(51) Int. Cl.
*G06K 9/00* (2006.01)
*G06T 7/136* (2017.01)

(56) References Cited

U.S. PATENT DOCUMENTS

| | | | |
|---|---|---|---|
| 8,749,796 B2 | 6/2014 | Pesach et al. | |
| 8,908,277 B2 | 12/2014 | Pesach et al. | |
| 9,063,283 B2 | 6/2015 | Shpunt et al. | |
| 2009/0316116 A1* | 12/2009 | Melville | A61B 1/0008 353/31 |
| 2010/0199232 A1* | 8/2010 | Mistry | G06F 1/163 715/863 |
| 2011/0037953 A1 | 2/2011 | Nizani et al. | |
| 2013/0195351 A1* | 8/2013 | Hamada | G06K 9/6211 382/159 |
| 2014/0376092 A1 | 12/2014 | Mor | |
| 2015/0293590 A1* | 10/2015 | Lehtiniemi | G06F 3/016 715/702 |
| 2016/0063724 A1* | 3/2016 | Tunstall | G06T 7/0014 382/128 |
| 2016/0291200 A1 | 10/2016 | Bakin et al. | |
| 2017/0090020 A1 | 3/2017 | Buettgen | |
| 2017/0135617 A1 | 5/2017 | Alasirniö et al. | |

\* cited by examiner

PROJECTING A STRUCTURED LIGHT PATTERN ONTO A SURFACE AND DETECTING AND RESPONDING TO INTERACTIONS WITH THE SAME

FIELD OF THE DISCLOSURE

The present disclosure relates to projecting a structured light pattern onto a surface and detecting and responding to interactions with the same.

BACKGROUND

Gesture recognition enables humans to communicate with a machine and interact, in some cases, without a mechanical device. Depending on the application, gestures can originate from any bodily motion or state, but commonly originate from movement of the hands or fingers. In gesture recognition technology, a camera reads the movements of the human body and communicates the data to a computing device that uses the gestures as input to control devices or applications.

SUMMARY

The present disclosure describes projecting a structured light pattern onto a surface and detecting and responding to interactions with the same.

For example, in one aspect, a method includes projecting a structured light pattern onto a projection surface, wherein the structured light pattern is composed of light of a particular wavelength. The method includes acquiring an image based on light of the particular wavelength reflected from a vicinity of the projection surface. The method further includes identifying regions of the acquired image that correspond to a feature that is within a specified distance of the projection surface by identifying regions of the acquired image for which intensity data differs relative to other regions of the acquired image and which fit a specified homographic relationship with respect to corresponding regions of a reference image. The method includes determining that the feature is a particular type of object, repeating the latter steps one or more times, and performing frame-to-frame tracking to determine a path of movement of the object. The method also includes determining that the object's path of movement represents a specified type of gesture.

Some implementations include one or more of the following features. For example, image morphology filtering and/or shape descriptor filtering can be performed with respect to the identified regions of the acquired image. In some cases, the method includes identifying regions of the acquired image for which the intensity differs by at least a predetermined threshold value.

In some instances, the particular wavelength is in the infra-red or near infra-red portions of the spectrum. In some implementations, the method includes projecting a visible pattern onto the projection surface at the same time as the structured light pattern is projected onto the projection surface.

The disclosure also describes an apparatus to implement the foregoing methods. For example, the apparatus can include a first projector operable to project a structured light pattern onto a projection surface, the structured light pattern being composed of light of a particular wavelength, and an image sensor operable to acquire images based on light of the particular wavelength reflected from a vicinity of the projection surface. One or more processors are operable collectively to identify regions of an acquired image that correspond to a feature that is within a specified distance of the projection surface by identifying regions of the acquired image for which intensity data differs relative to other regions of the acquired image and which fit a specified homographic relationship with respect to corresponding regions of a reference image. The processor(s) also determine that the feature is a particular type of object, repeat the foregoing steps one or more times for at least one other acquired image, perform frame-to-frame tracking to determine a path of movement of the object, and determine that the object's path of movement represents a specified type of gesture.

Various advantages are present in some implementations. For example, the techniques described here can, in some cases, facilitate recognizing that an object (e.g., a user's hand) is adjacent the plane of the projection surface and can distinguish the object from the projection surface itself. Movement of the object (e.g., the user's hand) then can be interpreted, for example, as a specified type of gesture that can trigger a specified type of operation to occur. Example applications include the following: causing a display monitor to display an alphanumeric character, causing a light to be turned on, off or dimmed, or causing a computing device to transition to a next slide of a presentation.

In some instances, by storing reference image data during manufacture of the apparatus, the present techniques can reduce the number of computations that need to be performed during use of the apparatus by a user. Further, in some cases, the present techniques can be used even if the apparatus is rotated between images.

Other aspects, features and advantages will be readily apparent from the following detailed description, the accompanying drawings, and the claims.

DETAILED DESCRIPTION

The present disclosure describes an apparatus, including an optoelectronic module, operable to project a structured light pattern onto a surface (e.g., a wall) and to detect and respond to a user's interactions with the projected light pattern (e.g., via hand or other gestures). In particular, the apparatus is operable to acquire a test image, determine which parts of the test image (if any) fit a specified homographic relationship to features of a reference image, and to determine whether those parts of the test image contain an object of a particular type (e.g., a human hand). If it is determined that the test image contains an object of the particular type, gesture recognition techniques can be used to recognize a position or movement of the user's hand, or other object. The detected position or movement of the object then can be used as input that triggers a predetermined response in the module or an associated apparatus.

In some instances, an infra-red (IR) or other structured light pattern not visible to the human eye is projected onto the surface along with a visible light pattern. The visible pattern can be used, for example, to help direct the user to particular areas of the non-visible IR pattern, whose reflections from the surface or other object can be detected by the module. An example application includes projecting a structured IR light pattern onto a wall, and also projecting onto the wall a virtual keyboard using visible light. The apparatus can recognize and respond to the selection of keys on the virtual keyboard by a user using, for example, hand or finger gestures. In other instances, patterns may be projected onto a floor to allow users to play a virtual video or other game by interacting with a non-visible structured light pattern projected onto the floor. Here too, a visible pattern can be projected onto the floor to direct the users to particular areas of the floor where their interactions with the structured light pattern can be sensed by the module.

In some cases, only a non-visible pattern is projected onto the surface. For example, a specified IR pattern can be projected onto a wall of a home or office. By sliding her hand over the wall where the pattern is projected, the user can cause a specified response to occur (e.g., causing a light in the room to be turned on, off or dimmed). The apparatus described here can be used in other applications as well.

Figure 1:
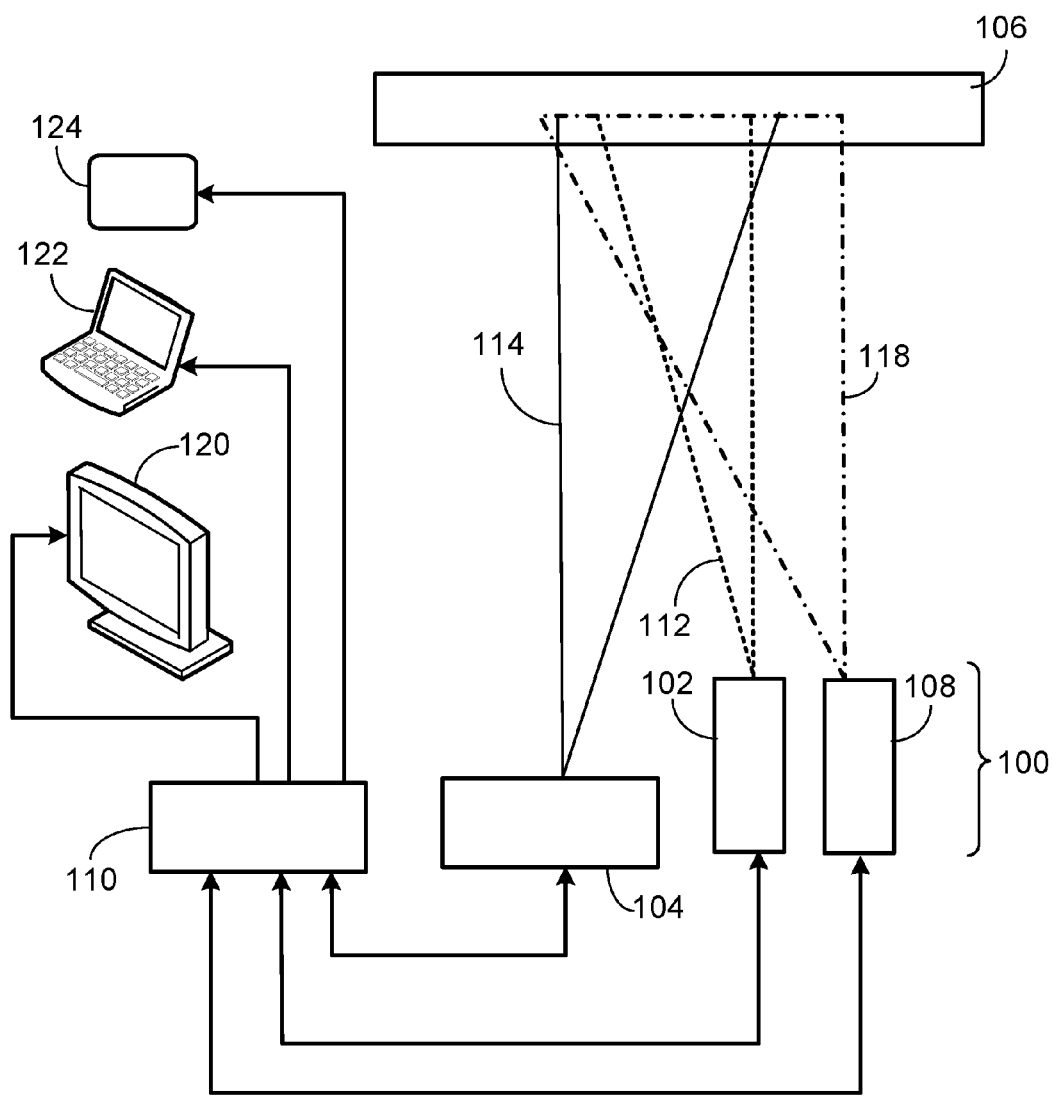
FIG. 1 illustrates an apparatus for generating a structured light pattern projected on a surface and detecting and responding to interactions with the same.

As shown in FIG. 1, a module 100 includes a first light projector 102 operable to project a structured light pattern 112. In some implementations, the projected pattern 112 consists of light in the IR or near-IR region of the spectrum. The light emitted by the structured light projector 102 can form, for example, a pattern 112 of discrete features (i.e., structured or encoded light) being projected onto a substantially flat surface 106 external to the module 100. The structured light, or a portion thereof, can be reflected, for example, by the surface 106. The reflected light can be sensed by an image sensor 104 that includes spatially distributed light sensitive components (e.g., pixels) that are sensitive to a wavelength of light emitted by the structured light projector 102. The image sensor 104 has a field of view (FOV) 114 arranged to capture at least some light that is emitted by the first light projector 102 and that subsequently is reflected by the surface 106. The detected signals can be read-out and used, for example, by processing circuitry 110. Using structured light can be advantageous, for example, in determining distance or disparity values.

In some instances, the structured light projector 102 can include, for example, a high-power light emitting element such as a laser diode, a VCSEL or an array of VCSELs operable to emit a predetermined range of wavelengths, e.g., in the IR or near-IR part of the spectrum. The structured light projector 102, in some cases, is operable to emit light in the range of about 850 nm±10 nm, or in the range of about 830 nm±10 nm, or in the range of about 940 nm±10 nm. Other wavelengths or ranges may be appropriate for some implementations.

The image sensor 104 can be implemented, for example, on a single integrated semiconductor chip as a CCD (charge-coupled device) sensor or CMOS (complementary metal-oxide-semiconductor) sensor.

In some implementations, the module 100 also includes a second light projector 108 operable to project a light pattern 118 in the visible part of the spectrum (e.g., RGB and/or other visible light). If the surface 106 falls within a given range of distances from the module 100, the patterns 112, 118 projected by the first and second light projectors 102, 108 onto the surface 106 will overlap, such that the visible pattern 118 appearing on the surface 106 can be used to indicate to a user the area of the surface 106 on which the non-visible structured light pattern 112 is projected.

The light projectors 102, 108 and the image sensor 104 can be mounted, for example, on the same substrate such as a printed circuit board (PCB). The processing circuitry 110 can be part of the module 100 itself or can be external to the module. In some cases, the processing circuitry 110 can be implemented, for example, as one or more integrated circuit chips, and can include a microprocessor programmed to process signals read out from the image sensor 104 in accordance with the techniques described in greater detail below. In some instances, the processing circuitry 110 is implemented as a laptop, desktop or other computing device that is coupled to the image sensor 110. The processing circuitry 110 also can be coupled to the light projectors 102, 108 to control, for example, when the light patterns are projected from the module 100. More generally, the processing circuitry 110 can be implemented as one or more processors programmed to implement the process(es) described here.

As explained in greater detail below, the processing circuitry 110 can be configured through hardware and/or software to process the signals from the image sensor to determine whether an object such as a user's hand or finger is in proximity to the surface 106 onto which the light patterns are projected and to determine whether the object is recognizable as a predetermined type (e.g., a human hand). For example, differences in intensity data in the acquired image and regions of the acquired image that fit a specified homographic relationship with a reference image can be used, together with image morphology filtering and shape descriptor filtering, to identify regions of the acquired image that may correspond to a user's hand or other object of interest interacting with the projected pattern of structured light 112. Frame-to-frame tracking of the object of interest can be performed to detect, for example, the trajectory of the object in the field of view 114. The shape descriptor data and trajectory data then can be compared to previously generated reference data to facilitate characterization of the object's movement (e.g., as a hand gesture) and, in response, to effect a specified action (e.g., turning a light on or off in response to the user swiping her hand in front of a wall; storing and/or displaying an alphanumeric character selected by a user by pointing to a key on a virtual keyboard projected onto a wall; causing an electronic presentation displayed on a screen to transition to a subsequent slide in response to a user swiping his hand in front of the screen).

Figure 2:
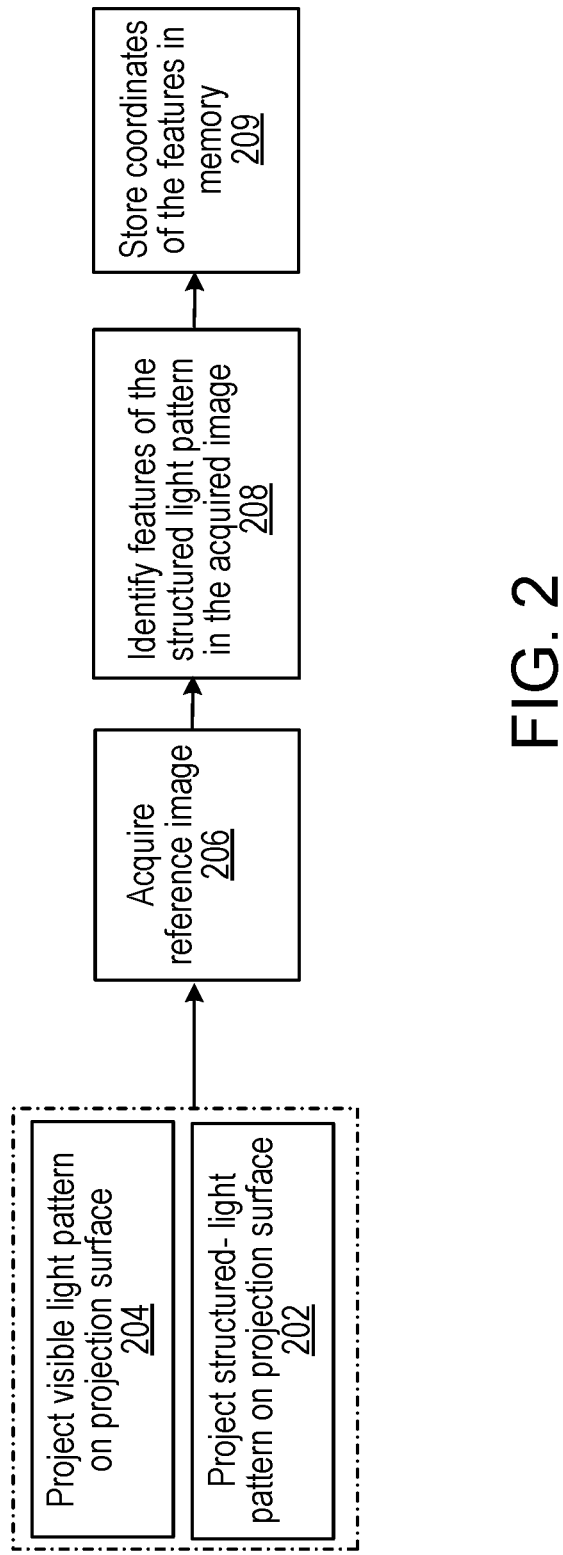
FIG. 2 is a flow chart of a method for storing reference image data.
Figure 3A:
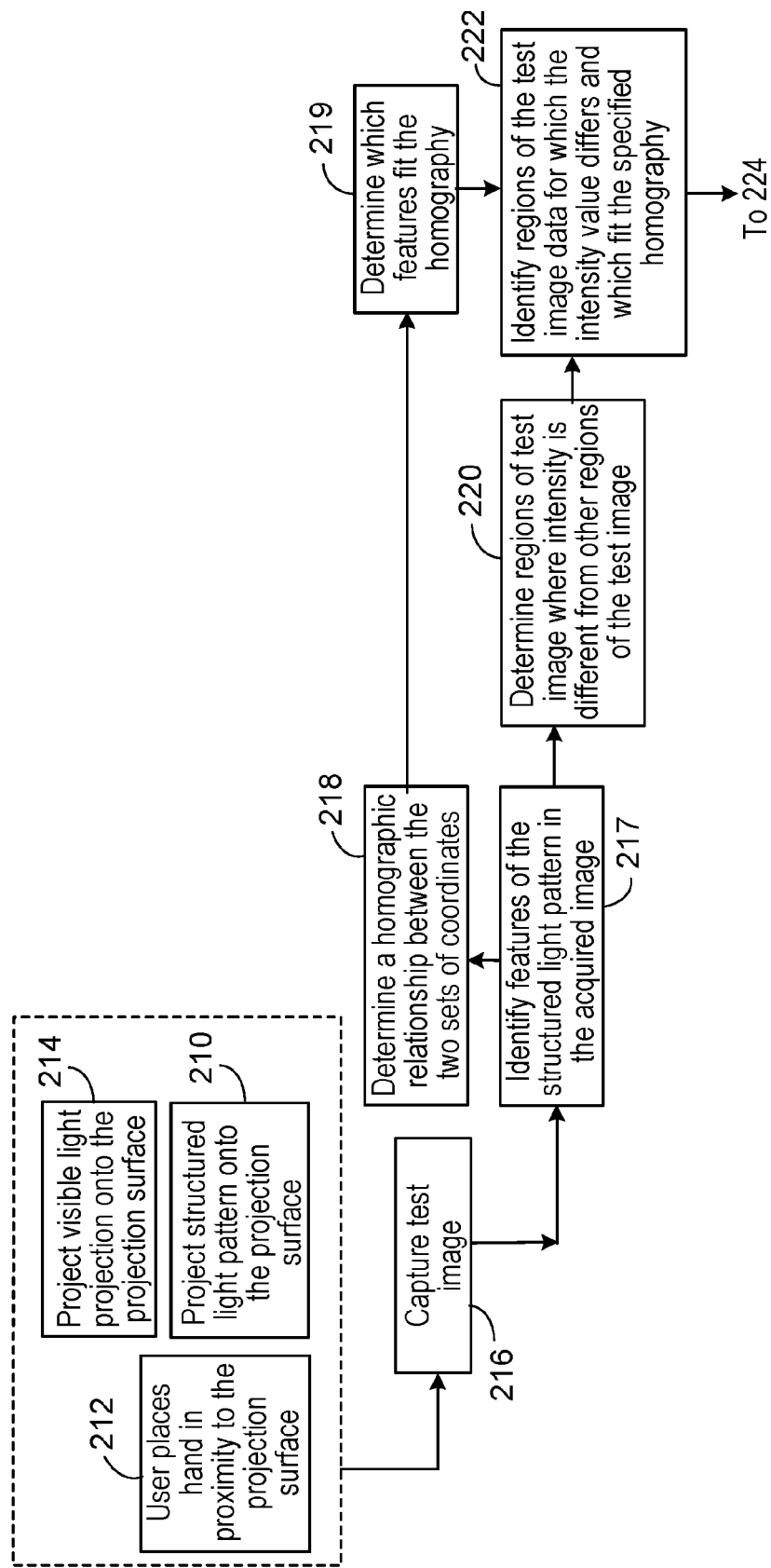
FIGS. 3A and 3B are a flow chart of a method for projecting a structured light pattern onto a surface and detecting and responding to interactions with the same.
Figure 3B:
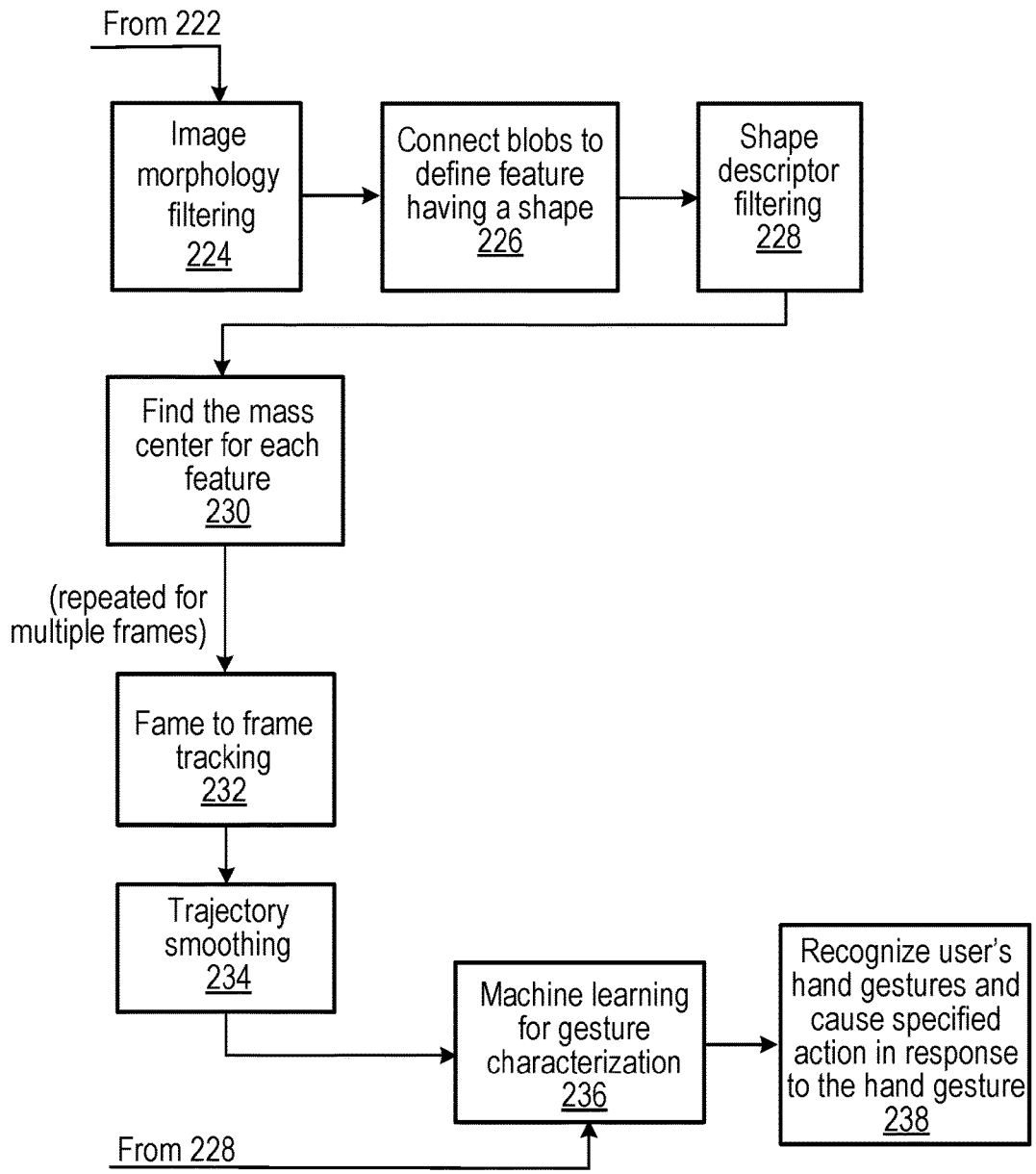

FIGS. 2 and 3A-3B indicate further details of these and other aspects of a method for acquiring image data using the module 100 and for processing the sensed image data. In the following example, reference is made to a user's hand, but in some instances, could be a user's other body part (e.g., finger) or some other object held by the user (e.g., a pointer).

FIG. 2 illustrates steps of the method that, in some implementations, are performed at a factory during manufacture of the module 100. The method includes using the structured light projector 102 to project a structured light pattern 114 onto a projection surface such as a wall or other substantially flat surface (202). In some implementations, the light projector 108 projects a visible light pattern 118 onto the projection surface 106 (204) while the structured light pattern 114 is projected onto the surface 106. In other cases, this step may be omitted. Reference image data is acquired using the image sensor 104 based on light reflected from the projection surface 106 (206). Based on the acquired reference image, the process identifies features of the structured light pattern (e.g., dots) in the acquired image (208) and stores the coordinates (x0, y0) of the features in memory (209).

In 208, the features of the structured light pattern can be identified, for example, using an adaptive thresholding technique, in which the image is segmented by setting all pixels whose intensity values are above a threshold to a foreground value and all the remaining pixels to a background value. Adaptive thresholding can change the threshold dynamically across the image so as to accommodate, for example, changing lighting conditions in the image. Thus, adaptive thresholding typically takes a grayscale or color image as input and, in some implementations, outputs a binary image representing the segmentation. For each pixel in the image, a threshold is calculated. If the pixel value is below the threshold it is set to the background value; otherwise it assumes the foreground value.

An example of a suitable adaptive thresholding technique is known as Otsu's method, which performs clustering-based image thresholding through the reduction of a gray level image to a binary image. Otsu's method assumes that the image contains two classes of pixels following a bi-modal histogram (e.g., foreground pixels and background pixels). The method then calculates the optimum threshold separating the two classes so that their combined spread (intra-class variance) is minimal or, equivalently, so that their inter-class variance is maximal. Other adaptive thresholding techniques can be used as well.

Once the coordinates (x0, y0) of the features are stored in memory (208), the module 100 can be shipped from the factory, for example, for sale and/or use by a customer or other user. In some instances, the foregoing steps may be performed at a time other than during manufacturer and factory configuration of the module 100.

As indicated by FIGS. 3A and 3B, during use of the module 100, while the structured light projector 102 projects a structured light pattern 114 onto the projection surface 106 (210) a user can place her hand in contact with or, or in close proximity to, a projection surface 106 (e.g., a wall) (212). In some implementations, the light projector 108 is used to project a visible light pattern 118 onto the projection surface 106 to guide the user to the area(s) of the projection surface 106 where she can interact with the non-visible structured light pattern (214). Test image data then is acquired using the image sensor 104 based on light reflected from the projection surface 106 and from the user's hand (216).

Based on the image data acquired in 216, the process identifies features of the structured light pattern (e.g., dots) in the acquired image and stores the coordinates (x, y) of the features in memory (217). As described in connection with 208, the features of the structured light pattern can be identified, for example, using an adaptive thresholding technique. The process then uses the stored coordinates (x0, y0) from the reference image and the coordinates (x, y) of the test image to determine a homographic relationship between the two sets of coordinates (218). Homography between two planes refers to a relationship that transforms the points of one plane into the corresponding points in the other plane. The homography thus describes the transformation of a planar set of points under perspective transformation. If the user's hand, for example, is in proximity to the projection surface 106, then the user's hand will be considered to be in the plane of the projection surface such that the structured light pattern features (e.g., dots) on the user's hand behave substantially like the structured light pattern features on the projection surface itself. On the other hand, if the user's hand or some other object that is not in proximity to the projection surface 106 interacts with the projected light pattern, the structured light pattern features (e.g., dots) on the user's hand or other object will behave differently. In general, only a subset of coordinates (x, y) (e.g., coordinates corresponding to the projected light pattern features on the projection surface or on the user's hand in close proximity to the projection surface) will fit the homography. Thus, the process also identifies which of the structured light pattern features (e.g., dots) in the image acquired in 216 fit the specified homography (219).

As indicated by 220, the process also identifies regions of the test image for which the detected intensity differs from other regions of the image (220). This can be accomplished, for example, by comparing the absolute difference of the intensity values for different parts of the image. The process assumes that changes in intensity are indicative of an object (e.g., a user's hand) interacting with the structured light pattern. In some cases, the process determines whether the difference (if any) in the intensity values exceeds some predetermined threshold rather than simply determining whether the intensity value changed. Then, based on the results of 219 (i.e., an identification of the structured light pattern features in the test image that fit the specified homography) and the results of 220 (i.e., an identification of the regions of the test image for which the detected intensity differs from other regions of the test image), the process identifies regions of the test image data for which the intensity value differs and which fit the specified homography (222). The process thus generates a binary image in which regions of the test image that are determined to correspond to the object (e.g., the user's hand) in close proximity to the projection surface 106 are assigned a value of 1, and regions of the test image that are determined not to correspond to the object (e.g., the user's hand) in close proximity to the projection surface 106 are assigned a value of 0.

Next, in 224, the process applies image morphology filtering to the binary image obtained in 222 using, for example, image dilation and erosion. Morphology refers to image processing operations that process images based on shapes. Dilation adds pixels to the boundaries of objects in an image, whereas erosion removes pixels on object boundaries. The number of pixels added or removed from the objects in an image depends on the size and shape of the structuring element used to process the image. In the morphological dilation and erosion operations, the state of any given pixel in the output image can be determined by applying a rule to the corresponding pixel and its neighbors in the input image. The rule used to process the pixels defines the operation as a dilation or an erosion. Erosion can be used, for example, to remove particles from the structured light pattern that result from random image noise or background noise. Erosion thereby shrinks such particles. In contrast, dilation can be used to increase the size of the remaining particles into clusters, and clusters of adjacent particles can be absorbed into a single contiguous region (i.e., a blob). The morphology filtering thus can facilitate reduction or elimination of the background noise.

As indicated in 226, the regions (i.e., blobs) formed in 224 can be connected to one another. The connection process can be accomplished, for example, for binary blobs in a binary image by tabulating all of the blobs and saving each blob as a tree (i.e., a list of pixels each of which has a value of 1 or 0). The blobs then can be connected or merged together, for example, in the following manner. The centers of the binary blobs within the binary image are computed and blobs located closer than a predetermined minimum distance are merged. As a result of the process 226, adjacent regions are connected or merged such that the connected or merged regions define a feature having a particular shape.

Next, as indicated by 228, the process performs shape descriptor filtering with respect to each feature generated in 226. For example, the list of pixels for each feature generated in 226 can be used to calculate the feature's shape properties (e.g., component area, center of mass, long axis, short axis, circularity, sodality). By predefining thresholds for each of these properties, features having unwanted shapes can be filtered out. For example, in some implementations, only the data for features shaped like a human hand would be retained. This part of the process can help eliminate false detections.

Next, as indicated in 230, the process determines a specified point, such as the mass center, for each feature identified in 228. For example, assuming that the process had identified a feature having the shape of a hand in 228, the process determines the hand's mass center. This step can be accomplished, for example, by using the seven Hu moments, which can be calculated from central moments that are invariant to size, position and orientation. See, e.g., Ming-Kuei Hu, "Visual Pattern Recognition by Moment Invariants," IRE Transactions on Information Theory, 179-187 (1962). The output generated by 230 is mass center data for each feature identified in 228 (i.e., the coordinates of mass center in the IR image). Other algorithms for determining the feature's mass center can be used as well.

The foregoing process (e.g., 210 through 230) can be repeated so as to obtain image data for multiple frames. Then the process can track the feature (e.g., the user's hand) from one frame to the next (232). Examples of suitable tracking techniques include the following: optics flow, template matching, the Mean Shift algorithm, the Continuously Adaptive Mean Shift (Camshift) algorithm, and the Kanade-Lucas-Tomasi (KLT) feature-tracking algorithm. The Mean Shift algorithm, for example, is a robust, non-parametric technique that climbs the gradient of a probability distribution to find the mode (peak) of the distribution; the CamShift algorithm is an adaptation of the Mean Shift algorithm for object tracking. The KLT algorithm accomplishes tracking by finding the parameters that minimize a dissimilarity measurement between feature windows that are related by a pure translation motion model. Other tracking algorithms can be used as well.

The process then can perform trajectory smoothing (234). The raw tracking trajectory sometimes is very noisy; thus a smoothing algorithm can be implemented to eliminate or reduce the noise. A suitable smoothing algorithm is Kalman filtering, also known as linear quadratic estimation (LQE), which uses a series of measurements observed over time, containing statistical noise and other inaccuracies, and produces estimates of unknown variables that tend to be more precise than those based on a single measurement alone, by using Bayesian inference and estimating a joint probability distribution over the variables for each timeframe. Other smoothing algorithms can be used as well. The trajectory smoothing generates smoothed trajectory data. In some instances, the trajectory smoothing can be omitted.

The shape descriptor data obtained in 228 and the trajectory data obtained in 232 (or 234) then can be used, for example, as inputs to a machine learning algorithm that characterizes the hand gestures (236). The machine learning algorithm can be configured, for example, to recognize and categorize one or more trajectories of a particular feature (e.g., a user's hand gesture) in the IR image in accordance with corresponding labels (e.g., "select," "confirm," "swipe," "zoom" or "rotate"), each of which can be indicative of a specified user instruction for a further action to be initiated. Once the system is trained or otherwise configured to recognize particular hand gestures, the process can be used, as indicated in 238, in any of a wide range of applications to trigger specified actions in response to the user's hand gestures (e.g., causing a light to be turned on, off or dimmed in response to the user swiping her hand in front of a wall; storing and/or displaying an alphanumeric character selected by a user by pointing to a key on a virtual keyboard projected onto a wall; causing an electronic presentation displayed on a screen to transition to a subsequent slide in response to a user swiping his hand in front of the screen).

Figure 4:
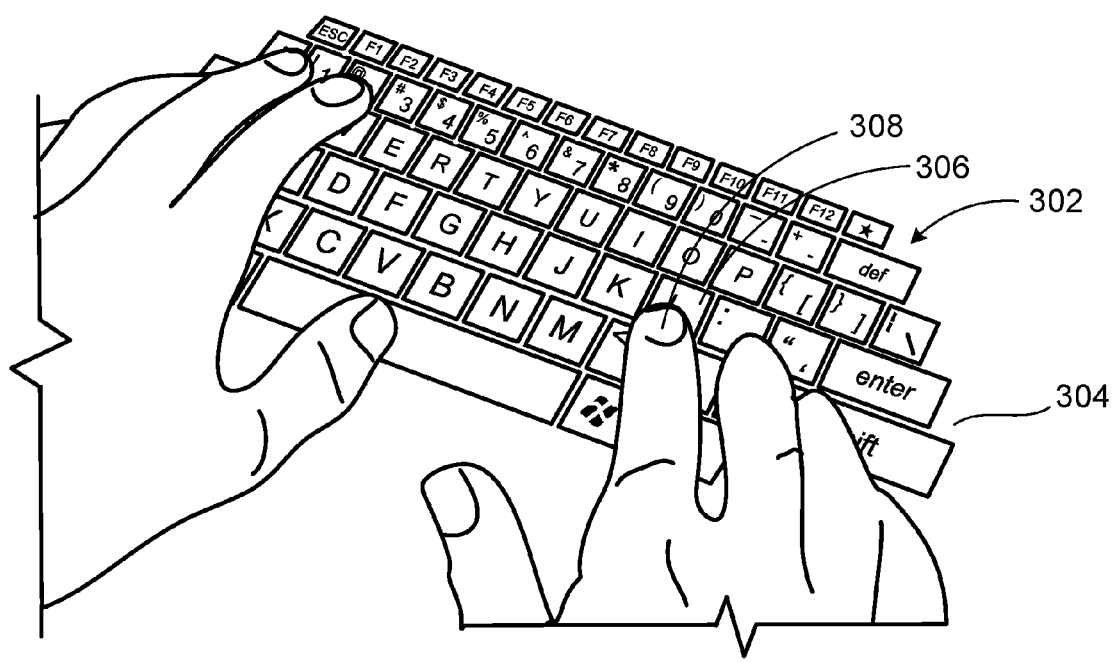
FIG. 4 illustrates an example of an application of the present techniques.

FIG. 4 illustrates an example application of the process of FIG. 2 using the module 100 of FIG. 1. In this example, the visible light projector 108 projects a virtual keyboard 302 onto a projection surface 304, which in this example, can take the form of the top surface of a desk or table. The projected image of the virtual keyboard is visible to the user. At the same time, the structured light projector 102 projects, for example, a structured IR pattern onto the surface 304. The IR pattern, however, is not visible to the user. The user can select an alphanumeric or other key 306 on the virtual keyboard 302 by using a finger 308 to tap on the projection surface 304 where the desired alphanumeric key 302 appears. The light reflected by the surface 304 and by the user's finger is sensed by the image sensor 104 and the sensed signals can be processed by the processing circuitry 110 as described above. In this example, the process would recognize that the user had selected a particular key 306 on the virtual keyboard 302. In response, the processing circuitry 110 would take some predetermined action. For example, in some implementations, if the selected key 306 corresponds to a letter or number, the processing circuitry 110 would cause the letter or number to be displayed on a display monitor 120 coupled to the processing circuitry (see FIG. 1).

As noted above, depending on the application, the processing circuitry 110 can be coupled to other devices or apparatus (e.g., a laptop or other computing device operable to project a presentation onto a wall 122; an overhead or other light 124) that can be controlled to effect a predetermined action based on one or more signals from the processing circuitry 110 in response to detection by the processing circuitry 110 of a particular gesture by the user. In some cases, the other device or apparatus may be coupled wirelessly to the processing circuitry 110.

Various modification can be made within the spirit of this disclosure. Accordingly, other implementations are within the scope of the claims.

What is claimed is:

1. A method comprising:
    (a) projecting a structured light pattern onto a projection surface, the structured light pattern being composed of light of a particular wavelength;
    (b) acquiring an image based on light of the particular wavelength reflected from a vicinity of the projection surface;
    (c) identifying, by one or more processors, regions of the acquired image that correspond to a feature that is within a specified distance of the projection surface by identifying regions of the acquired image for which intensity data differs relative to other regions of the acquired image and which fit a specified homographic relationship with respect to corresponding regions of a reference image, and generating a binary image in which regions of the acquired image that are determined to correspond to the feature within the specified distance of the projection surface are assigned a first value, and regions of the acquired image that are determined not to correspond to the feature within the specified distance of the projection surface are assigned a second different value;
(d) use the binary image to determine, by the one or more processors, that the feature is a particular type of object;
(e) repeating (b), (c) and (d) one or more times;
(f) performing frame-to-frame tracking to determine a path of movement of the object; and
(g) determining, by the one or more processors, that the object's path of movement represents a specified type of gesture.

2. The method of claim 1 including determining the homographic relationship between a first set of coordinates in the reference image and a second set of coordinates in the acquired image.

3. The method of claim 1 including performing image morphology filtering with respect to the identified regions of the acquired image.

4. The method of claim 1 including performing shape descriptor filtering with respect to the identified regions of the acquired image.

5. The method of claim 1 wherein, in (c), regions of the acquired image are identified for which intensity data differs relative to other regions of the acquired image by at least a predetermined threshold value.

6. The method of claim 1 wherein the particular wavelength is in the infra-red or near infra-red portions of the spectrum.

7. The method of claim 1 further including projecting a visible pattern onto the projection surface at the same time as the structured light pattern is projected onto the projection surface.

8. The method of claim 1 further including:
in response to determining that the object's path of movement represents a specified type of gesture, causing another apparatus to perform a specified operation based on the type of gesture.

9. The method of claim 8 wherein causing another apparatus to perform a specified operation based on the type of gesture includes at least one of the following:
causing a display monitor to display an alphanumeric character;
causing a light to be turned on, off or dimmed;
causing a computing device to transition to a next slide of a presentation.

10. An apparatus comprising:
a first projector operable to project a structured light pattern onto a projection surface, the structured light pattern being composed of light of a particular wavelength;
an image sensor operable to acquire images based on light of the particular wavelength reflected from a vicinity of the projection surface; and
one or more processors operable collectively to:

(a) identify regions of an acquired image that correspond to a feature that is within a specified distance of the projection surface by identifying regions of the acquired image for which intensity data differs relative to other regions of the acquired image and which fit a specified homographic relationship with respect to corresponding regions of a reference image, and generate a binary image in which regions of the acquired image that are determined to correspond to the feature within the specified distance of the projection surface are assigned a first value, and regions of the acquired image that are determined not to correspond to the feature within the specified distance of the projection surface are assigned a second different value;
(b) use the binary image to determine that the feature is a particular type of object;
(c) repeat (a) and (b) one or more times for at least one other acquired image;
(d) perform frame-to-frame tracking to determine a path of movement of the object; and
(e) determine that the object's path of movement represents a specified type of gesture.

11. The apparatus of claim 10 wherein the one or more processors are operable to perform image morphology filtering with respect to the identified regions of the acquired image.

12. The apparatus of claim 10 wherein the one or more processors are operable to perform shape descriptor filtering with respect to the identified regions of the acquired image.

13. The apparatus of claim 10 wherein the one or more processors are operable, in (a), to identify regions of the acquired image for which intensity data differs relative to other regions of the acquired image by at least a predetermined threshold value.

14. The apparatus of claim 10 wherein the particular wavelength is in the infra-red or near infra-red portions of the spectrum.

15. The apparatus of claim 10 further including a second light projector operable to project a visible pattern onto the projection surface at the same time as the structured light pattern is projected onto the projection surface.

16. The apparatus of claim 10 further including a device, wherein the one or more processors are operable, in response to determining that the object's path of movement represents a specified type of gesture, to cause the device to perform a specified operation based on the type of gesture.

17. The apparatus of claim 10 wherein the one or more processors are operable, in response to determining that the object's path of movement represents a specified type of gesture, to perform at least one of the following:
cause a display monitor to display an alphanumeric character;
cause a light to be turned on, off or dimmed;
cause a computing device to transition to a next slide of a presentation.

* * * * *